March 3, 1964 C. T. LEWIS 3,122,806
GRIPPING DEVICE

Filed Oct. 8, 1962 2 Sheets-Sheet 1

INVENTOR.
CHARLES T. LEWIS
BY
Fishburn and Gold
ATTORNEYS

March 3, 1964 C. T. LEWIS 3,122,806
GRIPPING DEVICE
Filed Oct. 8, 1962 2 Sheets-Sheet 2

INVENTOR.
CHARLES T. LEWIS
BY
Fishburn and Gold
ATTORNEYS

United States Patent Office 3,122,806
Patented Mar. 3, 1964

3,122,806
GRIPPING DEVICE
Charles T. Lewis, P.O. Box 4755, Oklahoma City, Okla.
Filed Oct. 8, 1962, Ser. No. 229,010
7 Claims. (Cl. 24—123)

This invention relates to gripping devices, and more particularly to the style of gripping device known as cable grips wherein strands of wire or wire cord are diagonally woven or interlaced to form an open mesh in a tubular form for longitudinal extension and contraction and the diameter reduced when extended and increased when contracted so as to respectively grip and release cables or other articles or objects engaged thereby.

Gripping devices have been used for pulling cables, rope and other objects and may be used to pull lines over sheaves, crown blocks or traveling blocks used on drilling rigs in oil fields and the like, and also gripping devices may be used for pulling electrical wire or wires through conduits and the like where the curvatures of the paths present difficulties. Heretofore, it has been the regular procedure to use a wire rope grip with its normal internal diameter approximately equal to or less than the external diameter of the lines or wires to be pulled. Also, it is well known that often a cable or wire rope such as an oil field drilling line will be cut to length in the field before it is pulled over the derrick crown, the cutting leaving sharp edges where the cable is cut. Also, electrical cables are field cut before pulling, leaving sharp cutting edges. Ordinarily, the sharp edges do not present a major problem with the pulling of lines or wire until they are pulled over a sheave or pulley such as crown sheaves or traveling blocks or on electrical wiring in pulling same through conduits that are curved sometimes being bent up to 90 degrees. When this condition occurs, the sharp cutting edges of the cut lines or wires tend to apply pressure at the side of the grip cage or body and set up a cutting action on the side of the grip at the place to which the cut end of the line or wire had been inserted into the circular rope gripping body. Flexibility is desired in the gripping devices, and rope or cable grips are commonly manufactured from small diameter extremely soft pliable and flexible wire. The cutting action as described above reduces the useful life of the gripping device and also increases the chances of having the grip fail while pulling loads. At points of abrasion and particularly at the points of contact between the grip body and the lines or wires being pulled, the cutting action causes the strands of wire cord to have individual wires separated by abrasion, creating outwardly extending points or whiskers which easily penetrate into a workman's hands, making it hazardous to workmen when the grip is being installed or removed.

The principal objects of the present invention are to provide a gripping device which, due to its novel construction, tends to eliminate and overcome the above-mentioned disadvantages of grips heretofore used; to provide a gripping device with each of the strands or wire cords having a protective coating or sheath that is tough, flexible and, due to flexibility, provides increased bearing surface under pressure that protects the strands from abrading action and also increases the grip on an article to be pulled; to provide such a structure wherein the flexible protective covering on the strand serves as a cushion between the strands and an article being gripped and thereby reduces the possible damage to a soft metal or other covering on a cable or the like being gripped; to provide a gripping device wherein intermediate portions of the strands are arranged in longitudinal side-by-side relation in the form of an eye and then extend in a spirally interwoven relation to form the body portion with the free ends of the strands secured together at the article-receiving end of said body portion, the strands at the eye having a flexible sheath surrounding same whereby the eye is flexible to facilitate movement thereof over sheaves or around bends in conduits; to provide such a structure wherein the flexible eye and side-by-side relationship of the strands therein tend to equalize the tensile stress on the several strands in the eye and body portion; to provide such a structure wherein the protective coating or sheath on the strands or wire cord provides increased strength and prevents fraying or any resulting projection of wire whiskers and thereby reduces or eliminates hazards that would otherwise be presented to workmen handling same; to provide a gripping device wherein the strands at the draft end are brought together in groups between the draft end and eye with a flexible sheath enclosing each of the groups of strands from the eye to the draft end of the body portion whereby the pull exerted on the eye can be substantially off from the central axis of the article being pulled; to provide such a structure wherein the strands in the groups and in the eye are arranged side by side whereby the strands are slidable longitudinally relative to each other to equalize tensile stress on the several strands; and to provide a gripping device that is economical to manufacture, long wearing, that can be handled without injury by frayed or protruding wire ends and that is highly flexible in the body and eye to pass smoothly through sheaves and conduits.

Other objects and advantages of this invention will become apparent from the following description taken in connection with the accompanying drawings wherein are set forth by way of illustration and example certain embodiments of this invention.

Figure 1:
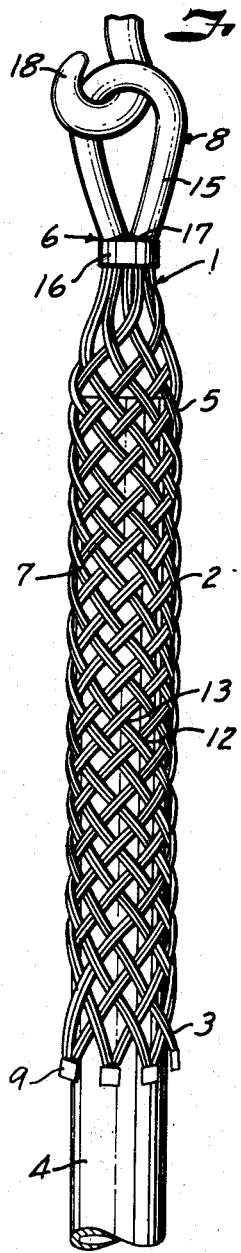
FIG. 1 is a side elevation of a gripping device embodying features of the present invention and in position around an article to be held or pulled.

Referring more in detail to the drawings:

The reference numeral 1 generally designates a gripping device having a woven tubular body 2 with an article-receiving end 3 through which an article 4 is adapted to be inserted to be positioned within the body portion 2. The body portion has a draft end 5 with a pulling head 6 extending therefrom. The gripping device preferably comprises a plurality of strands 7 spirally interwoven with each other about a common axis to form the tubular open mesh body portion 2. In the illustrated structure, the strands 7 are woven in pairs or double strands; however, it is to be understood that the body portion of the gripping device may be woven with single strands, double strands or triple strands, as is well known in the art, for accommodating various service conditions.

The strands 7 are extended continuously from the article-receiving end 3 to the draft end 5 of the body and then brought together in longitudinally side-by-side relation and bent to form a return loop or eye 8 and then returned to the article-receiving end where they are suitably joined together by connectors 9 such as metal members crimped thereon, soldered or otherwise suitably secured thereto. Each of the strands 7 preferably consist of wire or wire cord 10, as for example what is commonly referred to as "aircraft steel strand cable" that is of high tensile strength and having substantial flexibility or bendability. A flexible sheath 11 surrounds the wire strands or cords 10 for the length thereof from the fastening devices 9 back to the fastening devices 9. The sheath 11 may be in the form of a tube sleeved over the stranded wire cord, and is preferably a coating of plastic material applied with the plastic flowable whereby it will enter in the interstices between the fine wires of the wire cord 10. The plastic material may be any suitable flexible plastic and preferably one of long wearing, tough characteristics such as polyethylene, polyvinylchloride or the like.

Figure 2:
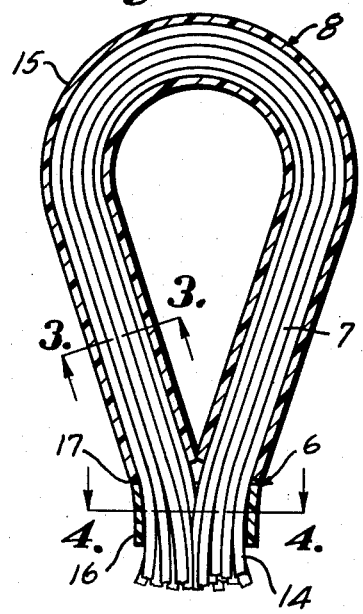
FIG. 2 is an enlarged longitudinal sectional view through the eye portion of the gripping device.
Figure 3:
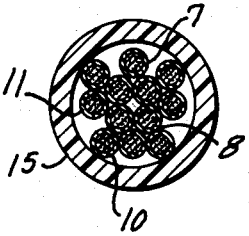
FIG. 3 is a transverse sectional view through the eye portion taken on the line 3—3, FIG. 2.
Figure 4:
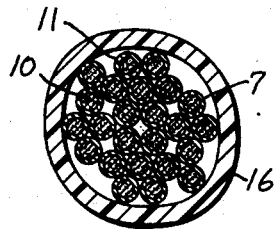
FIG. 4 is an enlarged transverse sectional view through the gripping device adjacent the eye portion and taken on the line 4—4, FIG. 2.
Figure 5:
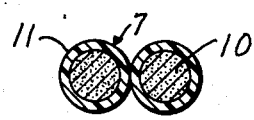
FIG. 5 is a greatly enlarged transverse sectional view through two of the coated strands.

As shown in FIG. 1, the covered strands 7 are woven over and then under, as at 12 and 13 respectively, in a basket weave generally spirally to form the tubular mesh body portion 2. From the draft end 5 of the body portion, the covered strands are brought together at one side as at 14 and in longitudinally side-by-side relation which relation continues around the loop or eye 8 and then back to the draft end of the body portion from which they extend through the woven structure to the article-receiving end. It is preferred that the eye portion have a flexible plastic sleeve 15 of suitable flexible plastic such as polyvinylchloride or polyethylene in surrounding engaging relation to the group of strands in the eye, as illustrated in FIGS. 1 to 3 inclusive, the sleeve 15 extending for the full longitudinal length of the strands in the eye, as illustrated in FIG. 2. It is preferred that a tubular collar 16 extend around all of the strands between the eye and the body portion, preferably at the ends 17 of the sleeve 15, as illustrated in FIGS. 1 and 2, to aid in holding the strands in position and cooperate in forming the pulling head 6. Each of the strands in the eye portion extend alongside of adjacent strands whereby said strands are movable longitudinally relative to the others. The arrangement of the strands in the eye portion, together with the flexible character of the sleeve 15 and collar 16 provides a flexible eye or pulling head capable of changing in contour as it is moved over sheaves or in conduits to more nearly conform to the path to reduce stress and provide a better bearing action on such curved surfaces.

In making a gripping device constructed as described, the coated strands 7 are cut to desired length, collected together and a sleeve 15 moved over said strands to the portion intermediate the ends thereof. The strands 7 and sleeve 15 are then bent as a group at the portion covered by the sleeve 15 to form the eye portion and then the collar 16 is moved over the ends of all of the strands to a position at the ends of the sleeve 15. The ends extending from the collar 16 are then woven to form the tubular body portion 2 and the ends of the strands are then suitably connected as by the connector members 9 to retain the strands in the woven shape.

In using a gripping device constructed as described, the body portion 2 is compressed longitudinally to increase its diameter whereby an article 4 can be inserted into the article-receiving end 3 and moved inwardly into the body portion for a substantial length thereof, as illustrated in FIG. 1. The gripping device body portion is then lightly held against the article, and a suitable device 18 connected to the eye portion 8 of the pulling head 6 to apply a longitudinal pulling action at the draft end 5 of the device. This pull tends to extend the body portion longitudinally and thereby provide a contraction radially to reduce the diameter in the body portion whereby the body portion will tightly grip the article 4. The flexible, resilient sheath 11 on the wire strands or cord 10 tends to flatten under pressure, thereby increasing the contacting surfaces of the strands 7 and the article 4, providing an increased gripping action but also a cushioning to reduce damage to soft articles, as for example a soft metal sheath on a cable. The pull applied to the eye 8 may not be on the longitudinal axis of the article 4, or, if for other reasons such as irregularities in the article and the direction of force, there may be a tendency of the strands on one side to be stressed greater than the strands on the other. However, the longitudinally slidable relationship of the various strands in the eye portion and said strands being continuous from the article-receiving end of the body portion, the individual strands may move to accommodate the application of the force whereby the tensile stress on the various strands is equalized. Substantially the entire gripping device is protected by flexible plastic material which adds strength but also protects the small wires in the wire cord 10 from abrading action or cutting action of either the article 4, other strands or objects on the path through which it is moved. This protection provides longer life and prevents the small wires from protruding as whiskers and causing injury to persons handling same. This structure also provides a better bearing action and movement on paths as it eliminates the projecting wires and the like that could interfere or catch on surfaces along the path.

Figure 6:
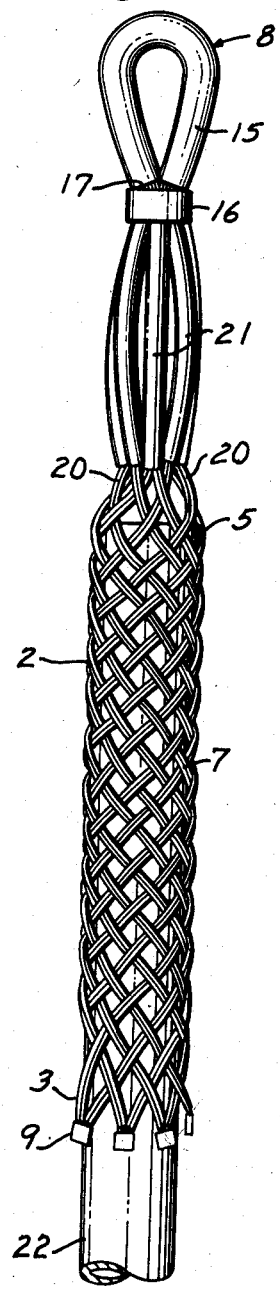
FIG. 6 is a side elevation of a modified form of gripping device, with the body portion positioned on an article.
Figure 7:
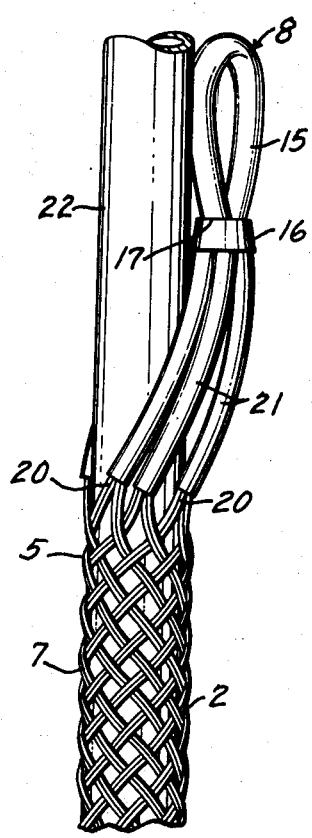
FIG. 7 is a partial side elevation of the modified form of gripping device positioned on an article that extends beyond the eye portion wherein the pull is on a line spaced from the central axis of the gripping device and article.
Figure 8:
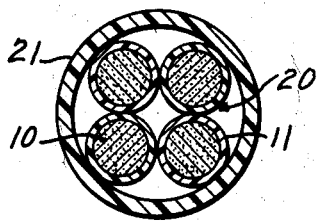
FIG. 8 is an enlarged transverse sectional view through one of the sheathed groups of strands between the body and eye of the gripping device.

In the form of the invention illustrated in FIGS. 6 to 8 inclusive, the same coated strands 7 are utilized and woven to form the body portion 2 with an article-receiving end 3 and a draft end 5 substantially as illustrated and described relative to the form of the invention illustrated in FIGS. 1 to 5 inclusive. The eye portion 8 has the strands arranged therein and longitudinally slidable in a sleeve 15 with a collar 16 surrounding all of the strands adjacent the ends 17 of the sleeve 15. However, the collar 16 has greater spacing from the draft end 5 of the body portion 2 whereby the strands extending therebetween may be separated into spaced groups 20. In the particular structure illustrated where the strands are woven in a double strand weave, two of the double strands or in other words four individual strands are arranged with a flexible plastic sleeve 21 extending thereover from the collar 16 to the draft end 5 of the body portion. The strands are divided into groups having equal numbers of strands with each group having a sleeve 21 thereover. The length of the groups of strands from the collar 16 to the body portion 2 is preferably such that with an article 22 extending through the body portion and beyond the eye 8, the groups 20 can be separated whereby the article will pass between certain groups, as illustrated in FIG. 7. With this arrangement, the pulling force can be applied to the eye at one side of the article and the relative movability of the strands will apply the force to the grip to tighten same about the article and permit pulling force to be applied thereto with the article and the strands being protected throughout the gripping device, the strands in the groups 20 between the draft portion of the body and the eye being protected by the respective sleeves 21 and the eye portion 8 being protected by the sleeve 15 to further reduce any possibility of any abrading of the strands. The form of the invention illustrated in FIGS. 6 to 8 inclusive is made in a similar manner to that described relative to the form of the invention illustrated in FIGS. 1 to 5 inclusive except that the sleeves 21 are placed on the groups of strands and moved to the collar 16 before the strands are woven into the body portion 2 and secured by the fastening devices 9. This form of the invention can be utilized substantially in the same manner as the form of the invention illustrated in FIGS. 1 to 5 inclusive in being applied to articles and pulling same where the articles extend only to the draft end of the body portion. However, this form also permits application to and positioning of the gripping device on articles where the article will extend beyond the eye portion with the pulling force at one side of the article.

It is to be understood that while I have illustrated and described certain forms of my invention, it is not to be limited to the specific forms or arrangements of parts herein described and shown except insofar as such limitations are included in the claims.

What I claim and desire to secure by Letters Patent is:

1. In a gripping device of the character described,
   (a) a plurality of wire strands spirally interwoven with each other about a common axis to form a tubular open mesh body portion adapted to be placed in surrounding gripping relation with an article, said body portion having a draft end,
   (b) said strands extending continuously from an article-receiving end of said body portion to the draft end and return to said article-receiving end,
   (c) means securing ends of the strands together at said article-receiving end,
   (d) intermediate portions of said strands extending from the draft end of the body portion and brought together in an eye forming loop,
   (e) a flexible sleeve surrounding the strands forming the eye whereby said eye changes shape to accommodate uneven loading,
   (f) and a flexible collar embracing all of the strands adjacent the ends of the flexible sleeve to retain the loop in the form of an eye and permit flexing of eye portions to accommodate uneven loading.

2. In a gripping device of the character described,
   (a) a plurality of wire strands spirally interwoven with each other about a common axis to form a tubular open mesh body portion adapted to be placed in surrounding gripping relation with an article, said body portion having a draft end,
   (b) said strands extending continuously from an article-receiving end of said body portion to the draft end and return to said article-receiving end,
   (c) means securing ends of the strands together at said article-receiving end,
   (d) intermediate portions of said strands extending from the draft end of the body portion and brought together in an eye forming loop,
   (e) a flexible sheath surrounding each of said strands for the lengths thereof,
   (f) and a flexible sleeve on the strands forming the eye with said strands each being slidable longitudinally relative to said sleeve and each other in said eye whereby said eye changes in shape to accommodate uneven loading and tensile strains on the several strands tend to equalize.

3. In a gripping device of the character described,
   (a) a plurality of wire strands spirally interwoven with each other about a common axis to form a tubular open mesh body portion adapted to be placed in surrounding gripping relation with an article, said body portion having a draft end,
   (b) said strands extending continuously from an article-receiving end of said body portion to the draft end and return to said article-receiving end,
   (c) means securing ends of the strands together at said article-receiving end,
   (d) intermediate portions of said strands extending from the draft end of the body portion and brought together in an eye forming loop,
   (e) a flexible sheath surrounding each of said strands for the lengths thereof,
   (f) a flexible sleeve on the strands forming the eye with said strands each being slidable longitudinally relative to said sleeve and each other in said eye whereby tensile strains on the several strands tend to equalize,
   (g) and means adjacent the ends of the sleeve between the eye and body portion and embracing the strands to retain the loop in the form of an eye.

4. In a gripping device of the character described,
   (a) a plurality of wire strands spirally interwoven with each other about a common axis to form a tubular open mesh body portion adapted to be placed in surrounding gripping relation with an article, said body portion having a draft end,
   (b) said strands extending continuously from an article-receiving end of said body portion to the draft end and return to said article-receiving end,
   (c) means securing ends of the strands together at said article-receiving end,
   (d) intermediate portions of said strands extending from the draft end of the body portion and brought together in an eye forming loop,
   (e) a flexible sheath surrounding each of said strands for the lengths thereof,
   (f) a flexible sleeve on the strands forming the eye with said strands each being slidable longitudinally relative to said sleeve and each other in said eye whereby tensile strains on the several strands tend to equalize,
   (g) and a flexible collar adjacent the ends of the sleeve between the eye and body portion and embracing all of the strands to retain the loop in the form of an eye.

5. In a gripping device of the character described,
   (a) a plurality of wire strands spirally interwoven with each other about a common axis to form a tubular open mesh body portion adapted to be placed in surrounding gripping relation with an article, said body portion having a draft end,
   (b) said strands extending continuously from an article-receiving end of said body portion to the draft end and return to said article-receiving end,
   (c) means securing ends of the strands together at said article-receiving end,
   (d) intermediate portions of said strands extending from the draft end of the body portion and brought together in an eye forming loop,
   (e) a flexible sleeve on the strands forming the eye with said strands each being slidable longitudinally relative to said sleeve and each other in said eye whereby tensile strains on the several strands tend to equalize,
   (f) intermediate portions of said strands extending from the draft end of the body portion to the eye being arranged in several groups each having approximately equal numbers of strands therein,
   (g) and flexible sleeves surrounding each of the groups of strands in said intermediate portions for substantially the length thereof between the body portion and eye.

6. In a gripping device of the character described,
   (a) a plurality of wire strands spirally interwoven with each other about a common axis to form a tubular open mesh body portion adapted to be placed in surrounding gripping relation with an article, said body portion having a draft end,
   (b) said strands extending continuously from an article-receiving end of said body portion to the draft end and return to said article-receiving end,
   (c) means securing ends of the strands together at said article-receiving end,
   (d) intermediate portions of said strands extending from the draft end of the body portion and brought together in an eye forming loop,
   (e) a flexible sleeve on the strands forming the eye with said strands each being slidable longitudinally relative to said sleeve and each other in said eye whereby tensile strains on the several strands tend to equalize,
   (f) means adjacent the ends of the sleeve between the eye and body portion and embracing the strands to retain the loop in the form of an eye,
   (g) intermediate portions of said strands extending from the draft end of the body portion to the eye being arranged in several groups each having approximately equal numbers of strands therein, (h) and flexible sleeves surrounding each of the groups of strands in said intermediate portions for substantially the length thereof between the body portion and eye.

7. In a gripping device of the character described, (a) a plurality of wire strands spirally interwoven with each other about a common axis to form a tubular open mesh body portion adapted to be placed in surrounding gripping relation with an article, said body portion having a draft end, (b) said strands extending continuously from an article-receiving end of said body portion to the draft end and return to said article-receiving end, (c) means securing ends of the strands together at said article-receiving end, (d) intermediate portions of said strands extending from the draft end of the body portion and brought together in an eye forming loop, (e) a flexible sheath surrounding each of said strands for the lengths thereof, (f) a flexible sleeve on the strands forming the eye with said strands each being slidable longitudinally relative to said sleeve and each other in said eye whereby tensile strains on the several strands tend to equalize, (g) means adjacent the ends of the sleeve between the eye and body portion and embracing the strands to retain the loop in the form of an eye, (h) intermediate portions of said strands extending from the draft end of the body portion to the eye being arranged in several groups each having approximately equal numbers of strands therein, (i) and flexible sleeves surrounding each of the groups of strands in said intermediate portions for substantially the length thereof between the body portion and eye.

References Cited in the file of this patent

UNITED STATES PATENTS

| | | |
|---|---|---|
| 1,114,637 | Nolan | Oct. 20, 1914 |
| 1,396,098 | Curtis | Nov. 8, 1921 |
| 1,657,722 | Page | Jan. 31, 1928 |
| 1,730,155 | Martin | Oct. 1, 1929 |
| 1,819,430 | Martin et al. | Aug. 18, 1931 |
| 2,356,209 | Brilhart | Aug. 22, 1944 |
| 2,434,358 | Frank | Jan. 13, 1948 |
| 2,560,418 | Di Palma | July 10, 1951 |
| 2,688,172 | Kellems | Sept. 7, 1954 |
| 2,974,559 | Coggi | Mar. 14, 1961 |
| 3,048,078 | Kaplan | Aug. 7, 1962 |